W. ELLSWORTH.
FISH TACKLE.
APPLICATION FILED DEC. 5, 1918.

1,296,057.

Patented Mar. 4, 1919.

WILLIAM ELLSWORTH.
INVENTOR,
BY R. C. Wright.
ATTY.

UNITED STATES PATENT OFFICE.

WILLIAM ELLSWORTH, OF PARKWOOD, OREGON.

FISH-TACKLE.

1,296,057.   Specification of Letters Patent.   Patented Mar. 4, 1919.

Application filed December 5, 1918. Serial No. 265,453.

*To all whom it may concern:*

Be it known that I, WILLIAM ELLSWORTH, a citizen of the United States, residing at Parkwood, in the county of Multnomah and State of Oregon, have invented a new and useful Improvement in Fish-Tackle, of which the following is a specification, reference being had to the accompanying drawings.

My invention relates to a class of devices for fishing.

The object of my device is to provide in the tackle, means to absorb the sudden shock caused by the limit tension of the line when operated, also to provide an arrangement whereby the line will not part should my device give way. I attain these objects, as well as other advantages, by the construction, combination and arrangement of parts illustrated in the accompanying drawings which form a part hereof.

Like numerals refer to like parts in each figure.

Figures 1, 2:
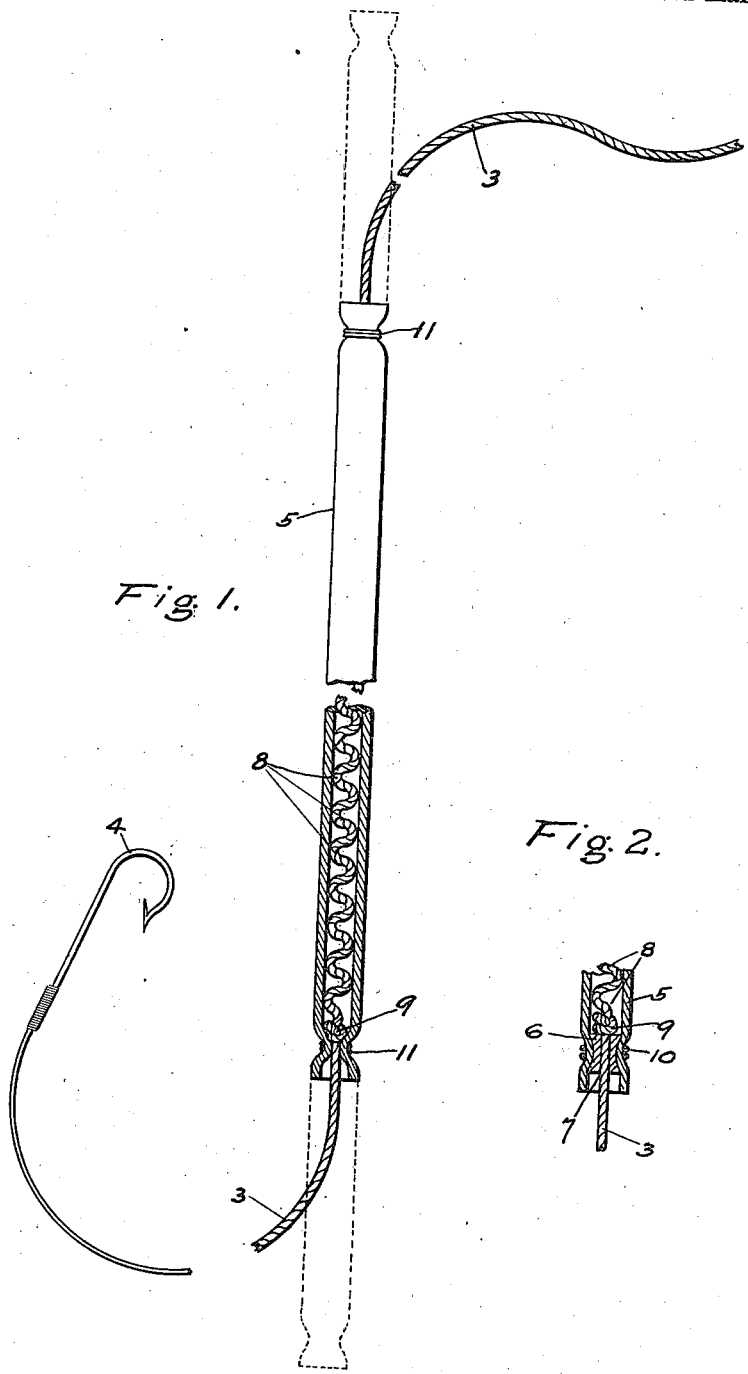
Figure 1 is a plan view of the device illustrated with hook and line, parts being in section.
Fig. 2 is a sectional view of one end of the rubber tube with binding spool therein.

A line 3 of common type may be employed, with a fish hook 4 of desired kind secured upon the end of the line. The line 3 extends through a rubber tube 5 of desired diameter and length. Within the tube and near its ends may be placed spools 6 for facility in binding the tube. An illustration of the spool is shown in Fig. 2. The line 3 extends through an opening 7 in the spools. Between the spools 6 the line 3 is formed in coils 8 within the tube and also has knots 9 tied in desired places to engage the inner surfaces of the spools. The same arrangement of the line is made when the spools are not used and the knots 9 engage the surface of the tube on the inner side of the places where it is bound as shown in Fig. 1. A binding means 10 is placed about the exterior of the tube and opposite the center of the spool to secure the same in a desired place near the end of the tube. When the spool is not used a binding means 11 is placed about the tube near the ends thereof.

It will be understood that the fundamental principle of my invention is the transmission of the tension upon the line on that part between where it enters and passes from the tube, from the line to and through the intervening tube of rubber. When small tubes are used, or for any other reason, the spools cannot be as practically employed, the ends of the tube are bound as illustrated.

It will be observed now that when a fish takes the hook, the line knots 9 engage the inner surfaces of the spools, or of the tied parts of the tube, as the case may be, and the tension of the line is taken up through the rubber tube, which expands elastically as indicated in the dotted line portions in Fig. 1. The shock which the line tension would otherwise sustain, when a fish draws it suddenly and strongly to its limit, is thus obviated. By this device the line will yield elastically to the tension until the fish ceases its efforts to escape the hook and it is drawn in without difficulty notwithstanding the elastic play of the rubber tube. It will be further observed that should a fastening break or become loose, either upon a spool or upon the tube, or the tube itself break, the coils 8 are released and the line plays outwardly from the tube and is manipulated in the ordinary manner. Thus the tube may be saved from loss as also the line and hook. I have found that substantially made rubber tubing of good material will sustain a very great elastic tension of the line, as proposed in my device, and most practically and efficiently in operation. The size and strength of the tubing naturally depends upon the character of the fish to be caught with my tackle. I have demonstrated in actual practice that the working of the device with such larger fish as salmon is very successful. These fish, as is well known, are powerful, and often cause lines or poles to break and a loss of the gear results, as well as a loss of the fish tackled at the time. It is highly important to employ a device of the kind illustrated for the reason that in trolling against a swift current, the fish will draw the line with a far greater shock to the tension limit than in quiet waters. My device is particularly and most advantageously adapted to deep sea fishing, and in this the tides and waves likewise cause great strain upon the line and pole when the line is suddenly drawn to the limit of tension. It may be here remarked that it is a common custom to use a pole extending transversely from the side of a vessel, with two or three lines on the pole and two or three trolling hooks to a line. When a vessel thus equipped is moving at fair speed for trolling, and two or three large fish tackle hooks on such a line, the sudden and strong tension on the gear is tremendous. It is then often broken or parts are lost as well as the catch. It is in such circumstances that my device is peculiarly useful. It will be understood that the rubber tube may be placed near the pole or near the sinker, as may be most advantageous for the waters cruised and character of fish to be tackled. Two tubes may also be employed, one in each place, if desired, and with advantage.

I claim—

In a fish tackle, the combination of a line having a fish hook thereon, with a rubber tube of desired length and diameter, the line extending through the tube and a certain portion of the line being coiled within the tube, a binding means upon and near each end of the tube, and knots in the line within the tube adjacent to said binding means and in position to engage the inner surface of the tube where thus bound, substantially as described.

WILLIAM ELLSWORTH.

Witnesses:
DELIA SMITH WRIGHT,
M. S. CLEFTON.